US012804326B2

(12) United States Patent
Cai et al.

(10) Patent No.: US 12,804,326 B2
(45) Date of Patent: Nov. 17, 2026

(54) SOUND GENERATING MODULE AND ELECTRONIC DEVICE

(71) Applicant: GOERTEK INC., Weifang (CN)

(72) Inventors: Xiaodong Cai, Weifang (CN); Song Liu, Weifang (CN); Xianzhong Lang, Weifang (CN); Chengfei Zhang, Weifang (CN); Chunfa Liu, Weifang (CN)

(73) Assignee: GOERTEK INC., Weifang (CN)

( * ) Notice: Subject to any disclaimer, the term of this patent is extended or adjusted under 35 U.S.C. 154(b) by 136 days.

(21) Appl. No.: 18/839,485

(22) PCT Filed: Mar. 9, 2023

(86) PCT No.: PCT/CN2023/080520
§ 371 (c)(1),
(2) Date: Aug. 19, 2024

(87) PCT Pub. No.: WO2023/185412
PCT Pub. Date: Oct. 5, 2023

(65) Prior Publication Data

US 2025/0159412 A1 May 15, 2025

(30) Foreign Application Priority Data

Apr. 2, 2022 (CN) ......................... 202210344620.1

(51) Int. Cl.
*H04R 9/02* (2006.01)
*H04R 1/02* (2006.01)
(Continued)

(52) U.S. Cl.
CPC ............. *H04R 9/025* (2013.01); *H04R 1/025* (2013.01); *H04R 7/04* (2013.01); *H04R 9/045* (2013.01);
(Continued)

(58) Field of Classification Search
CPC .......... H04R 9/025; H04R 1/025; H04R 7/04; H04R 9/045; H04R 9/046; H04R 9/06; H04R 2400/11; H04R 2499/11
See application file for complete search history.

(56) References Cited

U.S. PATENT DOCUMENTS

2002/0168074 A1* 11/2002 Miyamoto ............... H04R 9/10 381/182
2004/0071303 A1* 4/2004 Furuya .................. H04M 1/035 379/433.02
(Continued)

FOREIGN PATENT DOCUMENTS

CN 2622976 Y 6/2004
CN 109040920 A 12/2018
(Continued)

OTHER PUBLICATIONS

International Search Report from International Application No. PCT/CN2023/080520 mailed Apr. 7, 2023.

*Primary Examiner* — Joseph Saunders, Jr.
(74) *Attorney, Agent, or Firm* — Shih IP Law Group, PLLC

(57) ABSTRACT

Disclosed are a sound generating module and an electronic device, the sound generating module including a sound generating unit, and the sound generating unit including a magnetic circuit system, a receiver unit and a speaker unit. The magnetic circuit system is provided with a first magnetic gap and a second magnetic gap; the receiver unit includes a first diaphragm and a first voice coil, the first diaphragm and the magnetic circuit system enclose to form a first rear cavity, the first voice coil is accommodated in the first rear cavity, one end of the first voice coil is coupled to the first diaphragm, and the other end of the first voice coil is inserted into the first magnetic gap; and the speaker unit includes a second diaphragm and a second voice coil, the second diaphragm and the magnetic circuit system enclose to form a second rear cavity.

14 Claims, 2 Drawing Sheets

(51) Int. Cl.

| | |
|---|---|
| ***H04R 7/04*** | (2006.01) |
| ***H04R 9/04*** | (2006.01) |
| ***H04R 9/06*** | (2006.01) |

(52) U.S. Cl.

CPC ............... *H04R 9/046* (2013.01); *H04R 9/06* (2013.01); *H04R 2400/11* (2013.01)

(56) References Cited

U.S. PATENT DOCUMENTS

| | | | | |
|---|---|---|---|---|
| 2004/0071309 | A1* | 4/2004 | Furuya ................... | H04R 9/063 381/345 |
| 2006/0153417 | A1* | 7/2006 | Furuya .................. | H04M 1/035 381/396 |
| 2015/0139479 | A1* | 5/2015 | Lai ......................... | H04R 9/025 381/412 |
| 2018/0295449 | A1 | 10/2018 | Morgan et al. | |

FOREIGN PATENT DOCUMENTS

| | | | |
|---|---|---|---|
| CN | 111343549 | A | 6/2020 |
| CN | 111935592 | A | 11/2020 |
| CN | 213126467 | U | 5/2021 |
| CN | 114268889 | A | 4/2022 |
| CN | 114449422 | A | 5/2022 |
| CN | 114866911 | A | 8/2022 |
| JP | 2002281593 | A | 9/2002 |
| JP | 2008259003 | A | 10/2008 |
| WO | 2022061983 | A1 | 3/2022 |

* cited by examiner

SOUND GENERATING MODULE AND ELECTRONIC DEVICE

TECHNICAL FIELD

The present application relates to the technical field of electro-acoustic transducer, and specifically, to a sound generating module and an electronic device including the sound generating module.

BACKGROUND

In recent years, in order to make the electronic products (such as mobile phones) in the related technology have a better stereo effect when they are in the speaker mode, and have a better privacy protection effect when they are in the handset mode, generally, a speaker module is used in the audio system of the electronic product to stack a receiver unit (referred to as solution 1), or a double-sided sound generating unit is directly used (referred to as solution 2), so as to emit two sound waves with the same phase for superposition and enhancement to improve the stereo effect in the speaker mode, or emit two sound waves with opposite phases based on the acoustic dipole effect to oppose and attenuate to improve the privacy protection effect in the handset mode.

However, when the above-mentioned solutions 1 and 2 is adopted, there are still many defects. Specifically, in solution 1: the speaker module and the receiver unit are two dividual devices. At this time, when the speaker module and the receiver unit are installed in the housing of the electronic device, they must be stacked back-to-back. The back-to-back stacking installation will inevitably make the two devices take up a very large installation space in the stacking direction when installed, but the thickness of the electronic device is generally set to be relatively thin, which will make it more difficult to integrally install the stacked speaker module and the receiver unit in the housing of the electronic device. At the same time, the two independent devices will also make the number of overall parts relatively large, resulting in an increase in the overall manufacturing cost of the electronic device. In solution 2: the two sets of vibration systems in the double-sided sound generating unit are generally disposed to share one acoustic back cavity. At this time, when the two sets of vibration systems are working separately, the airflow will interfere with each other when flowing due to the shared acoustic back cavity, thus affecting the vibration state of each vibration system and causing a series of problems such as increased nonlinear distortion and swing vibration abnormal sound, which affects the final sound effect.

SUMMARY

A main purpose of the present disclosure is to provide a sound generating module, which aims to achieve a better stereo effect of the electronic device when it is in the speaker mode and a better privacy protection effect when it is in the handset mode and further simplify the structure of the sound generating module and improve the convenience of installation in the electronic device, while ensuring the sound effect of the electronic device.

To achieve the above object, the present disclosure provides a sound generating module which includes a sound generating unit, wherein the sound generating unit includes:

a magnetic circuit system, wherein the magnetic circuit system is formed with a first magnetic gap and a second magnetic gap that are isolated from each other;

a receiver unit includes a first diaphragm and a first voice coil, wherein the first diaphragm and a side of the magnetic circuit system at which the first magnetic gap is formed enclose to form a first rear cavity, the first voice coil is accommodated in the first rear cavity, one end of the first voice coil is coupled to the first diaphragm, and the other end opposite to the one end is inserted into the first magnetic gap; and a speaker unit, including a second diaphragm and a second voice coil, wherein the second diaphragm and a side of the magnetic circuit system at which the second magnetic gap is formed enclose to form a second rear cavity, the second rear cavity and the first rear cavity are isolated from each other, the second voice coil is accommodated in the second rear cavity, one end of the second voice coil is coupled to the second diaphragm, and the other end opposite to the one end is inserted into the second magnetic gap.

Optionally, the first magnetic gap and the second magnetic gap are respectively formed on two opposite sides of the magnetic circuit system, and a center line of the first magnetic gap and a center line of the second magnetic gap are collinearly arranged.

Optionally, the magnetic circuit system includes:

a magnetic conductive component including a first magnetic conductive plate and a second magnetic conductive plate facing and spaced away from each other; and a magnet component, wherein the magnet component is arranged between the first magnetic conductive plate and the second magnetic conductive plate, and the magnet component includes an inner magnet, a middle magnet and an outer magnet, wherein the middle magnet surrounds an outer side of the inner magnet and is spaced apart from the inner magnet, and the middle magnet and the inner magnet enclose to form the first magnetic gap, and wherein the outer magnet surrounds an outer side of the middle magnet and is spaced apart from the middle magnet, and the middle magnet and the outer magnet enclose to form the second magnetic gap.

Optionally, the middle magnet has a closed annular structure, and the second magnetic conductive plate is not provided with an opening at a position corresponding to the first magnetic gap.

Optionally, the sound generating unit further includes:

a first frame disposed at a side of the first magnetic conductive plate away from the second magnetic conductive plate, the first diaphragm is fixed to the first frame and enclose, together with the first frame and the first magnetic conductive plate, to form the first rear cavity; and a second frame disposed at a side of the second magnetic conductive plate away from the first magnetic conductive plate, and the second diaphragm is fixed to the second frame and enclose, together with the second frame and the second magnetic conductive plate, to form the second rear cavity.

Optionally, the sound generating module further includes a fixing shell, wherein the fixing shell fixes the sound generating unit, and the fixing shell and the sound generating unit enclose to form an expanded cavity;

wherein the second rear cavity of the speaker unit communicates with the expanded cavity, the first rear cavity of the receiver unit is isolated from the expanded cavity, and the first rear cavity of the receiver unit communicates with an external space of the sound generating module.

Optionally, the expanded cavity communicates with the second rear cavity through the second magnetic gap.

Optionally, the outer magnet of the magnetic circuit system is provided with a first communicating hole, and the expanded cavity communicates with the second magnetic gap through the first communicating hole.

Optionally, the first magnetic conductive plate of the magnetic circuit system is provided with a second communicating hole at a position corresponding to the first communicating hole, and the first communicating hole communicates with the expanded cavity through the second communicating hole.

Optionally, the magnetic circuit system further includes a mesh cover, wherein the mesh cover is coupled to the first magnetic conductive plate, and covers the first communicating hole and the second communicating hole.

Optionally, the first frame of the receiver unit is provided with a first sound output channel in communication with the external space of the sound generating module at a position corresponding to the first diaphragm, and the fixing shell is provided with an avoidance structure for avoiding the first sound output channel.

Optionally, the first frame passes through the avoidance structure to outside, an outer wall of the first frame and an inner wall of the avoidance structure enclose to form an external channel, and the external channel is isolated from an internal space of the fixing shell; and the first frame is provided with a third communicating hole, and the first rear cavity communicates with the external channel through the third communicating hole.

Optionally, the third communicating hole is disposed on two opposite sides of a short axis of the first frame, and the fixing shell is coupled to an upper side of the first magnetic conductive plate of the magnetic circuit system.

Optionally, the fixing shell has a first surface corresponding to an exposed surface of the receiver unit, a second surface opposite to the first surface, and a side peripheral surface connecting the first surface and the second surface;

the fixing shell is provided with a second sound output channel at a position corresponding to the second diaphragm, and an outlet of the second sound output channel passes through the side peripheral surface.

Optionally, the second sound output channel includes a first channel section and a second channel section that communicate with each other in a sound output direction thereof, a sound passing direction of the first channel section is opposite to a sound passing direction of the first sound output channel, and a sound passing direction of the second channel section is provided at an angle to the sound passing direction of the first channel section.

The present disclosure further provides an electronic device, including:

- a housing having an installation cavity formed therein; and
- a sound generating module, wherein the sound generating module includes: a magnetic circuit system, wherein the magnetic circuit system is formed with a first magnetic gap and a second magnetic gap that are isolated from each other; a receiver unit including a first diaphragm and a first voice coil, wherein the first diaphragm and a side of the magnetic circuit system at which the first magnetic gap is formed enclose to form a first rear cavity, the first voice coil is accommodated in the first rear cavity, one end of the first voice coil is coupled to the first diaphragm, and the other end opposite to the one end is inserted into the first magnetic gap; and a speaker unit, including a second diaphragm and a second voice coil, wherein the second diaphragm and a side of the magnetic circuit system at which the second magnetic gap is formed enclose to form a second rear cavity, the second rear cavity and the first rear cavity are isolated from each other, the second voice coil is accommodated in the second rear cavity, one end of the second voice coil is coupled to the second diaphragm, and the other end opposite to the one end is inserted into the second magnetic gap. The sound generating module is installed in the installation cavity, and the first rear cavity of the sound generating module communicates with the installation cavity through the third communicating hole.

The sound generating module according to the embodiments of the present disclosure can have a speaker function and a receiver function by providing a receiver unit and a speaker unit, and two kinds of sound waves are emitted by the receiver unit and the speaker unit. At this time, when the phases of the two kinds of sound waves are the same, they can be superimposed to enhance the stereo effect, thereby improving the stereo effect in the sound output mode. That is, when the speaker unit is working in the sound output mode, the sound effect can be enhanced by controlling the receiver unit to emit sound waves with the same phase. When the phases of the two kinds of sound waves are opposite, based on the principle of acoustic dipole effect, the two kinds of sound waves with opposite phases can be canceled out to be attenuated, thereby improving the privacy protection effect in the handset mode. Moreover, since the receiver unit and the speaker unit of the sound generating module in this solution also share one magnetic circuit system, compared with simply stacking the receiver module and the speaker module back-to-back, the sound generating module in this solution can reduce the number of magnet systems, thereby simplifying the overall structure of the sound generating module and reducing the overall thickness, so as to improve the convenience of subsequent installation of the sound generating module on the electronic device.

At the same time, on the basis that the configuration that the receiver unit and the speaker unit of the sound generating module share one magnetic circuit system, the first diaphragm of the receiver unit can enclose, together with the magnetic circuit system, to form a first rear cavity, and the second diaphragm of the speaker unit can enclose, together with the magnetic circuit system, to form a second rear cavity isolated from the first rear cavity. At this time, since the first rear cavity in the receiver unit and the second rear cavity in the speaker unit are isolated, the first diaphragm in the receiver unit and the second diaphragm in the speaker unit vibrate only in the first rear cavity and the second rear cavity, respectively, and will not interfere with each other. In this way, it is ensured that the receiver unit and the speaker unit can work normally and stably, and the vibration state of each of the receiver unit and the speaker unit can be avoided from being affected and causing the possibility of a series of problems such as increased nonlinear distortion and swing vibration abnormal sound, thereby improving the sound effect of the electronic device. In summary, the sound generating module in the present disclosure realizes that the electronic device has a good stereo effect when it is in the speaker mode, and has a good privacy protection effect when it is in the handset mode. In addition, the structure of the sound generating module is simplified and its convenience of installation in the electronic device is improved, while the sound effect of the electronic device is also ensured.

BRIEF DESCRIPTION OF DRAWINGS

In order to more clearly illustrate the embodiments of the present disclosure or the prior art, the drawings required for use in the embodiments or the description of the prior art will be briefly introduced below. Obviously, the drawings described below are only some embodiments of the present disclosure. For ordinary technicians in this field, other drawings can be obtained based on the structures shown in these drawings without paying any creative work.

DESCRIPTION OF REFERENCE SIGNS IN THE DRAWINGS

Figure 1:
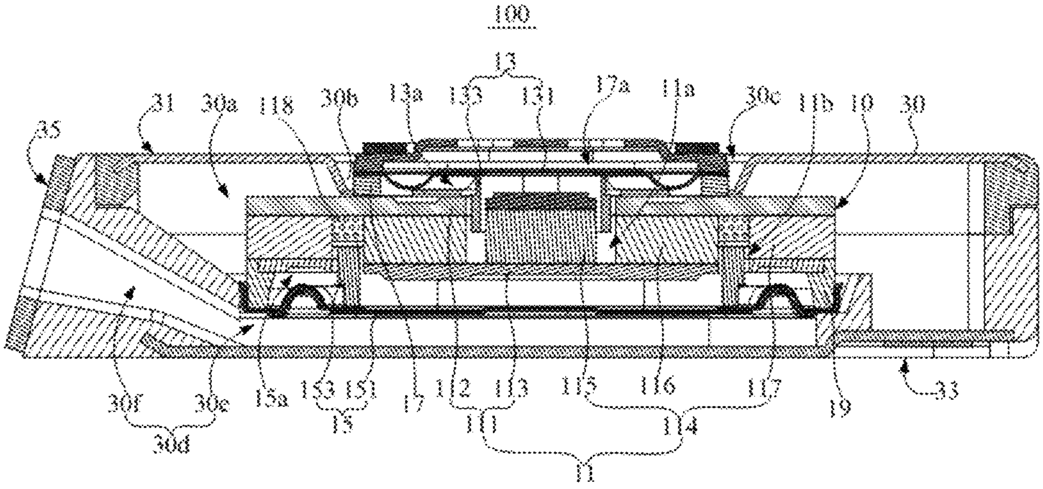
FIG. 1 is a cross-sectional schematic diagram of an embodiment of a sound generating module of the present disclosure.

| Sign | Name |
|---|---|
| 100 | Sound generating module |
| 10 | Sound generating unit |
| 11 | Magnetic circuit system |
| 11a | First magnetic gap |
| 11b | Second magnetic gap |
| 111 | Magnetic conductive component |
| 112 | First magnetic conductive plate |
| 112a | Second communicating hole |
| 113 | Second magnetic conductive plate |
| 114 | Magnet component |
| 115 | Inner magnet |
| 116 | Middle magnet |
| 117 | Outer magnet |
| 117a | First communicating hole |
| 118 | Mesh cover |
| 13 | Receiver unit |
| 131 | First diaphragm |
| 133 | First voice coil |
| 13a | First rear cavity |
| 15 | Loudspeaker unit |
| 151 | Second diaphragm |
| 153 | Second voice coil |
| 15a | Second rear cavity |
| 17 | First frame |
| 17a | First sound output channel |
| 17b | Third communicating hole |
| 19 | Second frame |
| 30 | Fixing shell |
| 30a | Expanded cavity |
| 30b | Avoidance structure |
| 30c | External channel |
| 31 | First surface |
| 33 | Second surface |
| 35 | Side peripheral surface |
| 30d | Second sound output channel |
| 30e | First channel section |
| 30f | Second channel section |

The achievement of the purpose, functional features and advantages of the present disclosure will be further explained in conjunction with embodiments and with reference to the accompanying drawings.

DETAILED DESCRIPTION

The following will be combined with the drawings in the embodiments of the present disclosure to clearly and completely describe the embodiments in the embodiments of the present disclosure. Obviously, the described embodiments are only part of the embodiments of the present disclosure, not all of the embodiments. Based on the embodiments of the present disclosure, all other embodiments obtained by ordinary technicians in this field without creative work are within the scope of protection of the present disclosure.

It should be noted that all directional indications (such as up, down, left, right, front, back, etc.) in the embodiments of the present disclosure are only used to explain the relative position relationship, movement status, etc. between the components under a certain specific posture (as shown in the accompanying drawings). If the specific posture changes, the directional indication will also change accordingly.

In the present disclosure, unless otherwise clearly specified and limited, the terms "connection", "fixation", etc. should be understood in a broad sense. For example, "fixation" can be a fixed connection, a detachable connection, or an integral connection; it can be a mechanical connection or an electrical connection; it can be a direct connection or an indirect connection through an intermediate medium, it can be the internal connection of two elements or the interaction relationship between two elements, unless otherwise clearly defined. For ordinary technicians in this field, the specific meanings of the above terms in the present disclosure can be understood according to specific circumstances.

In addition, the descriptions of "first", "second", etc. in the present disclosure are only used for descriptive purposes and cannot be understood as indicating or implying their relative importance or implicitly indicating the number of the indicated technical features. Therefore, the features referred to as "first" and "second" may explicitly or implicitly include at least one of the features. In addition, the embodiments between the various embodiments can be combined with each other, but they must be based on the ability of ordinary technicians in the field to implement them. When the combination of embodiments is contradictory or cannot be implemented, it should be deemed that such a combination of embodiments does not exist and is not within the scope of protection required by the present disclosure.

The present disclosure proposes a sound generating module 100, which can be applied to an electronic device, and the electronic device can specifically be a mobile phone or a tablet computer, and of course can also be other electronic devices for producing sounds.

Figure 2:
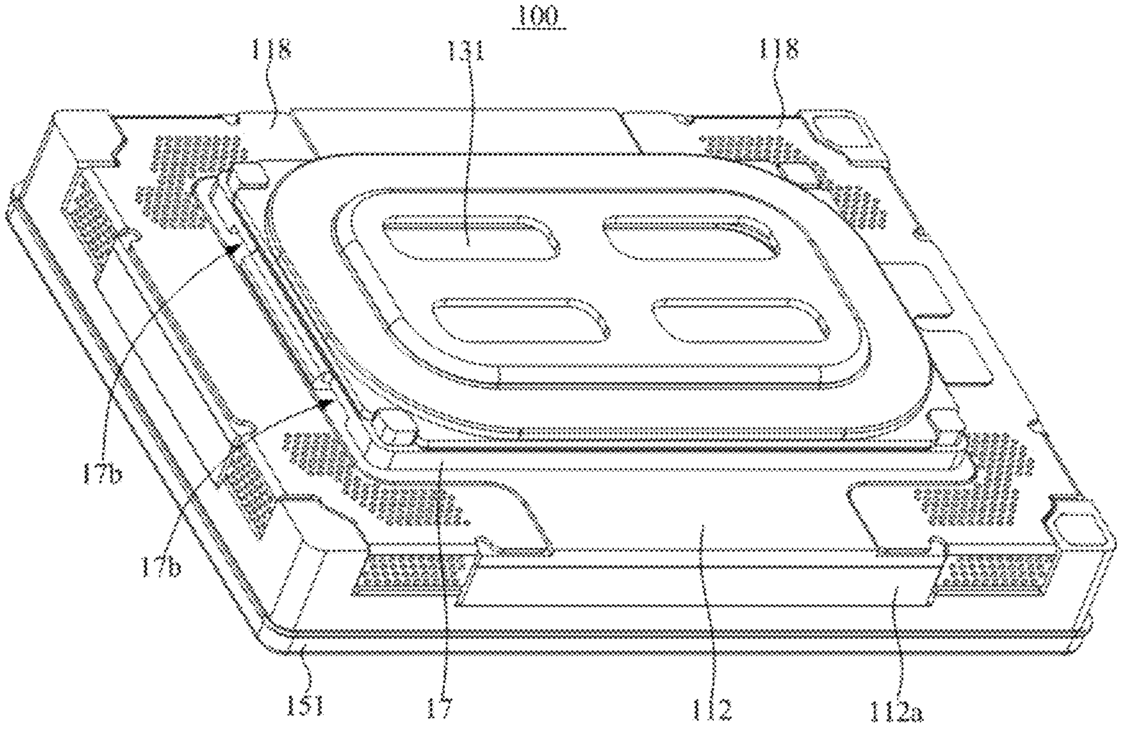
FIG. 2 is a partial structural schematic diagram of the sound generating module in FIG. 1.

Please refer to FIGS. 1 and 2 together, in an embodiment of the present disclosure, the sound generating module 100 includes a sound generating unit 10, and the sound generating unit 10 includes a magnetic circuit system 11, a receiver unit 13, and a speaker unit 15. The magnetic circuit system 11 is formed with a first magnetic gap 11*a* and a second magnetic gap 11*b* that are isolated from each other; the receiver unit 13 includes a first diaphragm 131 and a first voice coil 133. The first diaphragm 131 and a side of the magnetic circuit system 11 at which the first magnetic gap 11*a* is formed enclose to form a first rear cavity 13*a*. The first voice coil 133 is accommodated in the first rear cavity 13*a*, and one end of the first voice coil 133 is coupled to the first diaphragm 131, and the other end thereof is inserted into the first magnetic gap 11*a*; the speaker unit 15 includes a second diaphragm 151 and a second voice coil 153, the second diaphragm 151 and a side of the magnetic circuit system 11 formed with the second magnetic gap 11*b* enclose to form a second rear cavity 15*a*, the second rear cavity 15*a* and the first rear cavity 13*a* are isolated, the second voice coil 153 is accommodated in the second rear cavity 15*a*, and one end of the second voice coil 153 is coupled to the second diaphragm 151, and the other end thereof is inserted into the second magnetic gap 11*b*.

In this embodiment, the magnetic circuit system 11 can be used to form a first magnetic gap 11*a* and a second magnetic gap 11*b*, such that the first diaphragm 131 of the receiver unit 13 and the second diaphragm 151 of the speaker unit 15 can be inserted into the first magnetic gap 11*a* and the second magnetic gap 11*b*, respectively, so that the two are respectively positioned in two fixed magnetic fields. After that, the first diaphragm 131 of the receiver unit 13 and the second diaphragm 151 of the speaker unit 15 can be subjected to the Ampere force in the fixed magnetic field in the first magnetic gap 11*a* and the fixed magnetic field in the second magnetic gap 11*b* after being powered on, and then drive the first voice coil 133 and the second voice coil 153 to vibrate along their axe directions, respectively. At this time, since the first diaphragm 131 is fixedly connected to the first voice coil 133, it will be driven by the first voice coil 133 to realize the vibration and sounding of the receiver unit 13. Similarly, since the second diaphragm 151 is fixedly connected to the second voice coil 153, it will be driven by the second voice coil 153 to realize the vibration and sounding of the speaker unit 15. Here, when in the speaker mode, the sound can be produced only by the vibrating of the second diaphragm 151 of the speaker unit, and of course, the sound can also be further generated by the vibrating of the first diaphragm 131 of the receiver unit 13. At this time, it is necessary to control the phase of the sound wave emitted by the vibration of the first diaphragm 131 of the receiver unit 13 and the sound wave emitted by the vibration of the second diaphragm 151 of the speaker unit 15 to be the same, so that the two sound waves are superimposed to enhance the sound intensity, or to achieve a stereoscopic effect of sound wave surround. When in the handset mode, the receiver unit 13 and the speaker unit 15 need to work together. That is, by controlling the phases of the sound wave emitted by the vibration of the first diaphragm 131 of the receiver unit 13 and the sound wave emitted by the vibration of the second diaphragm 151 of the speaker unit 15 to be opposite, and then based on the principle of acoustic dipole effect, the two sound waves with opposite phases can be canceled out to be attenuated, to achieve privacy protection in the handset mode.

The sound generating module 100 of the embodiments of the present disclosure can have a speaker function and a receiver function by providing a receiver unit 13 and a speaker unit 15, and two sound waves are emitted by the receiver unit 13 and the speaker unit 15. At this time, when the phases of the two sound waves are the same, they can be superimposed to enhance the stereo effect, thereby improving the stereo effect in the speaker mode. That is, when the speaker unit 15 is working in the speaker mode, the receiver unit 13 can be controlled to emit sound waves with the same phase to enhance the sound effect. When the phases of the two sound waves are opposite, based on the principle of the acoustic dipole effect, the two sound waves with opposite phases can be canceled out to be attenuated, thereby improving the privacy protection effect in the handset mode. Moreover, since the receiver unit 13 and the speaker unit 15 of the sound generating module 100 share a magnetic circuit system 11, compared with simply stacking the receiver module and the speaker module back-to-back, the sound generating module 100 in this solution can reduce the installation number of magnet systems, which is beneficial to simplify the overall structure of the sound generating module 100 and reduce the overall thickness, so as to improve the convenience of installation of the sound generating module 100 to be applied to electronic devices.

Meanwhile, in the sound generating module 100 of the present disclosure, on the basis that the fact that the receiver unit 13 and the speaker unit 15 share one magnetic circuit system 11, the first diaphragm 131 of the receiver unit 13 can enclose, together with the magnetic circuit system 11, to form a first rear cavity 13*a*, and the second diaphragm 151 of the speaker unit 15 can enclose, together with the magnetic circuit system 11, to form a second rear cavity 15*a* isolated from the first rear cavity 13*a*. At this time, since the first rear cavity 13*a* in the receiver unit 13 and the second rear cavity 15*a* of the speaker unit 15 are isolated, the first diaphragm in the receiver unit 13 and the second diaphragm in the speaker unit 15 vibrate only in the first rear cavity 13*a* and the second rear cavity 15*a*, respectively, and will not interfere with each other. In this way, it is ensured that the receiver unit 13 and the speaker unit 15 can work normally and stably, and the possibility of a series of problems such as increased nonlinear distortion and sway vibration and abnormal sound caused by affecting the vibration state of the receiver unit 13 and the speaker unit 15 can be avoided, thereby improving the sound effect of the electronic device. In summary, the sound generating module 100 in this solution realizes that the electronic device has a good stereo effect when it is in the speaker mode, and has a good privacy protection effect when it is in the handset mode. In addition, it simplifies the structure of the sound generating module 100 and improves its convenience of installation in the electronic device, while also ensuring the sound effect of the electronic device.

Please refer to FIG. 1, in an embodiment of the present disclosure, the first magnetic gap 11*a* and the second magnetic gap 11*b* are respectively formed on opposite sides of the magnetic circuit system 11, and the center line of the first magnetic gap 11*a* and the center line of the second magnetic gap 11*b* are collinearly arranged.

In this embodiment, the first magnetic gap 11*a* and the second magnetic gap 11*b* are respectively arranged on the opposite surfaces of the magnetic circuit system 11, so that the receiver unit 13 and the speaker unit 15 can commonly use one magnetic circuit system 11, reducing the number of magnets required to be installed in the magnetic circuit system 11. Specifically, for example, in the present disclosure, to make the receiver unit 13 emit a smaller sound to protect the privacy of the call, and the speaker unit 15 emit a louder sound to improve the external speaker effect, the orthographic projection size of the receiver unit 13 is smaller than the orthographic projection size of the speaker unit 15. Here, the first magnetic gap 11*a* corresponding to the receiver unit 13 is installed on the outside of the second magnetic gap 11*b* corresponding to the speaker unit 15. In other words, the second magnetic gap 11*b* surrounds the outside of the first magnetic gap 11*a*. At this time, the second magnetic gap 11*b* and the first magnetic gap 11*a* can share a magnet (that is, the middle magnet 116 that appears later), thereby reducing the number of magnets to further simplify the structure of the sound generating module 100. At the same time, the first magnetic gap 11*a* and the second magnetic gap 11*b* are respectively arranged on the opposite surfaces of the magnetic circuit system 11, so that the receiver unit 13 and the speaker unit 15 can be respectively arranged on the opposite sides of the magnetic circuit system 11, which can make them more integrated and compact, thereby helping to reduce the overall volume of the sound generating module 100 and further improve its convenience of installation in electronic devices. In addition, the center line of the first magnetic gap 11a and the center line of the second magnetic gap 11b are arranged in a colinear manner, which can make the receiver unit 13 and the speaker unit 15 more regularly distributed and improve the convenience of molding. At the same time, such an arrangement can also further improve the compactness of the distribution of the receiver unit 13 and the speaker unit 15. Of course, it should be noted that the present disclosure is not limited thereto. In other embodiments, it is also possible for the first magnetic gap 11a and the second magnetic gap 11b to be arranged on the same side of the magnetic circuit system 11.

Please refer to FIG. 1, in an embodiment of the present disclosure, the magnetic circuit system 11 includes a magnetic conductive component 111 and a magnet component 114. The magnetic conductive component 111 includes a first magnetic conductive plate 112 and a second magnetic conductive plate 113. The first magnetic conductive plate 112 and the second magnetic conductive plate 113 face and space away from each other. The magnet component 114 is arranged between the first magnetic conductive plate 112 and the second magnetic conductive plate 113. The magnet component 114 includes an inner magnet 115, a middle magnet 116 and an outer magnet 117. The middle magnet 116 surrounds the outer side of the inner magnet 115 and is arranged at a distance from the inner magnet 115, the middle magnet 116 and the inner magnet 115 enclose to form a first magnetic gap 11a. The outer magnet 117 surrounds the outer side of the middle magnet 116 and is arranged at a distance from the middle magnet 116, the middle magnet 116 and the outer magnet 117 enclose to form a second magnetic gap 11b. It is better to distinguish the first magnetic conductive plate and the second magnetic conductive plate, because in the traditional sense, the middle magnetic conductive plate and the side magnetic conductive plate of the upper magnetic conductive plate are not the same component, and the same is true for the lower magnetic conductive plate. The two separated parts usually have different names.

In this embodiment, the first magnetic gap 11a can be formed and enclosed by the inner magnet 115 and the middle magnet 116 of the magnet component 114, and the second magnetic gap 11b can be formed and enclosed by the outer magnet 117 and the middle magnet 116. At this time, the first magnetic gap 11a and the second magnetic gap 11b also realize the sharing of the middle magnet 116 as described above, which is conducive to improving the degree of sharing of the magnetic circuit system 11 by the receiver unit 13 and the speaker unit 15, thereby greatly simplifying the structure. At the same time, the first magnetic gap 11a and the second magnetic gap 11b in this case can also be referred to be in a nested installation mode in the thickness direction of the magnetic circuit system 11 (that is, the direction in which the first magnetic conductive plate 112 and the second magnetic conductive plate 113 are separated and facing each other), which can minimize the space occupied by the first magnetic gap 11a and the second magnetic gap 11b in the thickness direction of the magnetic circuit system 11, thereby facilitating a significant reduction in the overall thickness of the sound generating module 100, so that it can be more conveniently installed in the limited installation space of the electronic device later. Here, the inner magnet 115 can be square, round or runway-shaped, etc., so that its shape is relatively regular and easy to process and shape. Of course, it can also be other shapes. That is to say, the specific shape of the inner magnet 115 is not limited in the present disclosure. Specifically, it can be adaptively set according to the shape of the first voice coil 133 of the receiver unit 13, to better adapt and accommodate the first voice coil 133. The middle magnet 116 can have a closed annular structure, to directly achieve the isolation of the first magnetic gap 11a and the second magnetic gap 11b. Moreover, at this time, the middle magnet 116 is an integral component, which can also facilitate one-time installation and improve the convenience of installation. Of course, the present disclosure is not limited thereto. In other embodiments, the middle magnet 116 can also be a plurality of spaced magnetic strip structures. At this time, a filler is disposed between the two adjacent magnetic strips to ensure that the first magnetic gap 11a and the second magnetic gap 11b can be isolated. Because the outer magnet 117 does not need to isolate the first magnetic gap 11a and the second magnetic gap 11b, the outer magnet 117 can have a closed annular structure, and of course it can also be a plurality of spaced magnetic strip structures. Furthermore, the first magnetic conductive plate 112 and the second magnetic conductive plate 113 of the magnetic conductive assembly 111 can be used to clamp and fix the magnet component 114, so that the inner magnet 115, the middle magnet 116 and the outer magnet 117 can be assembled together more conveniently. At the same time, the magnetic performance can also be enhanced by the first magnetic conductive plate 112 and the second magnetic conductive plate 113, which is conducive to improving the driving performance of the magnetic circuit system 11 on the receiver unit 13 and the speaker unit 15, and ensuring the acoustic performance of the receiver unit 13 and the speaker unit 15. Here, the first magnetic conductive plate 112 can be stacked on the surfaces of the inner magnet 115, the middle magnet 116 and the outer magnet 117 facing the receiver unit 13. Moreover, the first magnetic conductive plate 112 can be composed of two independent components, the first inner magnetic conductive plate and the first outer magnetic conductive plate, so that the first inner magnetic conductive plate and the first outer magnetic conductive plate have a higher degree of freedom during manufacturing. That is, the first inner magnetic conductive plate and the first outer magnetic conductive plate can be manufactured separately and independently, and the material selection and processing technology can be independently and adaptively selected. The second magnetic conductive plate 113 can be stacked on the surfaces of the inner magnet 115, the middle magnet 116 and the outer magnet 117 facing the second sound generating unit 13. Moreover, the second magnetic conductive plate 113 can include a second inner magnetic conductive plate and a second outer magnetic conductive plate. In this case, the second inner magnetic conductive plate is stacked on the inner magnet 115 and the middle magnet 116, and the second outer magnetic conductive plate is stacked on the outer magnet 117. The second voice coil 153 of the speaker unit 15 can pass through the gap between the second inner magnetic conductive plate and the second outer magnetic conductive plate and be inserted into the second magnetic gap 11b. Therefore, the second magnetic conductive plate 113 can be composed of two independent components, the second inner magnetic conductive plate and the second outer magnetic conductive plate, so that the second inner magnetic conductive plate and the second outer magnetic conductive plate have a higher degree of freedom during manufacturing. That is, the second inner magnetic conductive plate and the second outer magnetic conductive plate can be manufactured separately and independently, and the material selection and processing technology can be independently and adaptively selected. Of course, it should be noted that the present disclosure is not limited thereto. In other embodiments, when the receiver unit 13 and the speaker unit 15 are arranged on the same side of the magnetic circuit system 11, the magnetic circuit system 11 may include a first magnet and a second magnet surrounding the outer side of the first magnet, and a third magnet and a fourth magnet surrounding the outer side of the third magnet. At this time, the first magnet and the second magnet are spaced apart to form a first magnetic gap 11*a*, and the third magnet and the fourth magnet are spaced apart to form a second magnetic gap 11*b*.

Please refer to FIG. 1, in an embodiment of the present disclosure, the sound generating unit 10 also includes a first frame 17 and the first frame 17 is arranged at the side of the first magnetic conductive plate 112 away from the second magnetic conductive plate 113. The first diaphragm 131 is fixed to the first frame 17, and enclose, together with the first frame 17 and the first magnetic conductive plate 112, to form a first rear cavity 13*a*. The sound generating unit 10 also includes the second frame 19, and the second frame 19 is arranged at the side of the second magnetic conductive plate 113 away from the first magnetic conductive plate 112. The second diaphragm 151 is fixed to the second frame 19, and enclose, together with the second frame 19 and the second magnetic conductive plate 113, to form a second rear cavity 15*a*.

In this embodiment, the first frame 17 can be used to provide a mounting position to facilitate the fixing of the first diaphragm 131 of the receiver unit 13 on the first frame 17. Moreover, by fixing the first diaphragm 131 on the first frame 17, it is also convenient for the first diaphragm 131 to be installed in an unfolded state with a certain tension, and then it can vibrate and sound evenly and stably when driven by the first voice coil 133. Moreover, at this time, a certain interval can be provided between the first diaphragm 131 and the first magnetic conductive plate 112, so that the first rear cavity 13*a* formed and enclosed by the first diaphragm 131, the first frame 17 and the first magnetic conductive plate 112 has an integrated volume, thereby avoiding the large air resistance caused by the small volume of the first rear cavity 13*a*, which affects the smoothness of the vibration of the first diaphragm 131. Similarly, the second frame 19 can also be used to provide a mounting position to facilitate the fixing of the second diaphragm 151 of the speaker unit 15 on the second frame 19. Furthermore, by fixing the second diaphragm 151 on the second frame 19, the second diaphragm 151 can be installed in an unfolded state with a certain tension, and then can vibrate and sound evenly and stably when driven by the second voice coil 153. Moreover, at this time, a certain interval can be provided between the second diaphragm 151 and the second magnetic conductive plate 113, so that the second rear cavity 15*a* formed and enclosed by the second diaphragm 151, the second frame 19 and the second magnetic conductive plate 113 has an integrated volume, thereby avoiding the large air resistance caused by the small volume of the second rear cavity 15*a*, which affects the smoothness of the vibration of the second diaphragm 151. Here, both of the first frame 17 and the second frame 19 can have ring-shaped structures, and of course they can also have cover-shaped structures with one end open. The structures of the first frame 17 and the second frame 19 is not specifically limited in the present disclosure, and if only the first diaphragm 131, the first frame 17 and the first magnetic conductive plate 112 can enclose to form the first rear cavity 13*a*, and the second diaphragm 151, the second frame 19 and the second magnetic conductive plate 113 can enclose to form the second rear cavity 15*a*. In addition, it should be noted that the first frame 17 and the first magnetic conductive plate 112 can be an integral structure, and of course they can also be two separate components independently disposed.

Please refer to FIG. 1, in an embodiment of the present disclosure, the sound generating module 100 also includes a fixing shell 30, which fixes the sound generating unit 10, and an expanded cavity 30*a* is formed and enclosed by the fixing shell 30 and the sound generating unit 10. Here, the second rear cavity 15*a* of the speaker unit 15 communicates with the expanded cavity 30*a*, the first rear cavity 13*a* of the receiver unit 13 is isolated from the expanded cavity 30*a*, and the first rear cavity 13*a* of the receiver unit 13 communicates with the external space of the sound generating module 100.

In this embodiment, the fixing shell 30 can be used to install and fix the sound generating unit 10 as a whole, and at the same time, the fixing shell 30 can play a certain role in isolating and protecting the sound generating unit 10, which is conducive to reducing the possibility of the sound generating unit 10 being damaged by foreign objects and improving the service life of the sound generating unit 10. Moreover, the fixing shell 30 can also be enclose, together with the sound generating unit 10, to form an expanded cavity 30*a*. In this way, the expanded cavity 30*a* can be used to expand the second rear cavity 15*a*, ensuring that the air pressure change in the second rear cavity 15*a* can be adjusted through the expanded cavity 30*a*, avoiding the influence of the amplitude of the second diaphragm 151 due to the excessive air pressure in the second rear cavity 15*a*, and thus avoiding the influence on the sound sensitivity of the speaker unit 15. That is, the expanded cavity 30*a* greatly reduces the resistance of the second diaphragm 151 of the low speaker unit 15 when it vibrates, improves the smoothness of the vibration of the second diaphragm 151, and ensures the acoustic performance of the speaker unit 15. Similarly, the first rear cavity 13*a* of the receiver unit 13 communicates with the external space of the sound generating module 100, so that the first rear cavity 13*a* can communicate with the external air pressure, ensuring that the air pressure change in the first rear cavity 13*a* can also be adjusted through the external space of the sound generating module 100, thereby avoiding the influence of the amplitude of the first diaphragm 131 due to the excessive air pressure in the first rear cavity 13*a*. That is, through the communication with the external space of the sound generating module 100, the first diaphragm 131 of the receiver unit 13 can be prevented from being subjected to excessive resistance during the vibration process, which is conducive to improving the smoothness of the vibration of the first diaphragm 131 and ensuring the acoustic performance of the receiver unit 13. Furthermore, since the second rear cavity 15*a* of the speaker unit 15 communicates with the expanded cavity 30*a* provided in the sound generating module 100 itself, and the first rear cavity 13*a* of the receiver unit 13 communicates with the external space of the sound generating module 100, after the sound generating module 100 is installed in the installation cavity of the housing of the electronic device, the second rear cavity 15*a* of the speaker unit 15 also only communicates with the expanded cavity 30*a*, and only the first rear cavity 13*a* of the receiver unit 13 can communicate with the installation cavity of the housing of the electronic device because it communicates with the external space of the sound generating module 100. At this time, when the receiver unit 13 and the speaker unit 15 are working, the airflow driven by the speaker unit 15 will not transmit the airflow vibration to the installation cavity of the housing, but will only flow into the expanded cavity 30*a* provided on the sound generating module 100 itself, that is, only the airflow driven by the receiver unit 13 will cause collision in the installation cavity of the housing of the electronic device. At this time, since the positive projection size of the receiver unit 13 is relatively small, the airflow vibration amplitude that it can drive is relatively small, and then when the airflow vibration driven by the receiver unit 13 is transmitted to the installation cavity of the housing, the impact amplitude on the housing is also very small, which avoids the possibility of the housing of the electronic device producing a sense of vibration and affecting the user experience. Here, the expanded cavity 30*a* can be formed and enclosed by the fixing shell 30 and the magnetic circuit system 11, and of course, it can also be formed and enclosed by the fixing shell 30, the magnetic circuit system 11 and the second frame 19, or it can be formed and enclosed by the fixing shell 30, the magnetic circuit system 11 and the first frame 17. The specific enclosure form of the expanded cavity 30*a* is not limited in the present disclosure, and it should be ensured that one cavity that is isolated from the first rear cavity 13*a* and only communicates with the second rear cavity 15*a* can be formed. The first rear cavity 13*a* of the receiver unit 13 can communicate with the external space of the sound generating module 100 through the third communicating hole 17*b* on the first frame 17 described below.

Furthermore, the isolation of the first rear cavity 13*a* and the expanded cavity 30*a* needs to be explained as follows: The first rear cavity 13*a* and the expanded cavity 30*a* referred to in the present disclosure are separated by a large distance, which means that there is no communication structure that directly communicates the first rear cavity 13*a* and the expanded cavity 30*a* in the structure of the sound generating module 100 itself. Usually, a pressure relief hole (or pressure equalizing hole, or leakage hole) for pressure equalization can be provided on the expanded cavity 30*a*. The pressure relief hole can guide part of the airflow in the expanded cavity 30*a* to the outside/electronic devices, and the airflow in the first rear cavity 13*a* will also be directly guided to the outside/electronic devices. However, the pressure relief hole at this time is not a communication structure through which the first rear cavity 13*a* communicate with the expanded cavity 30*a*. The reasons are as follows: 1. The technical problem to be solved by the present disclosure is the problem of airflow interference caused when both sets of vibration systems communicate with the rear cavity. This solution of communication through a pressure relief hole obviously does not have the problem of airflow interference, and does not belong to the solution mentioned in the background technology section of the present disclosure in which the two vibration systems both communicate with the rear cavity, but belongs to the improved solution of the present disclosure in which the first rear cavity 13*a* is isolated from the expanded cavity 30*a;* 2. The function of the pressure relief hole in the rear cavity is pressure equalization, which is used to achieve micro-communication between the air pressure in the expanded cavity 30*a* and the external air pressure. In order not to affect the listening sensitivity, it is necessary to bond a damping mesh at the pressure equalization hole to provide a certain sound resistance; and the third communicating hole 17*b* on the first frame 17 in the present disclosure needs to achieve smooth communication between the first rear cavity 13*a* and the external airflow, and there is no need to provide a damping mesh. It can be seen that the functions of the pressure equalization hole and the third communicating hole 17*b* of the present disclosure are also different.

Figure 3:
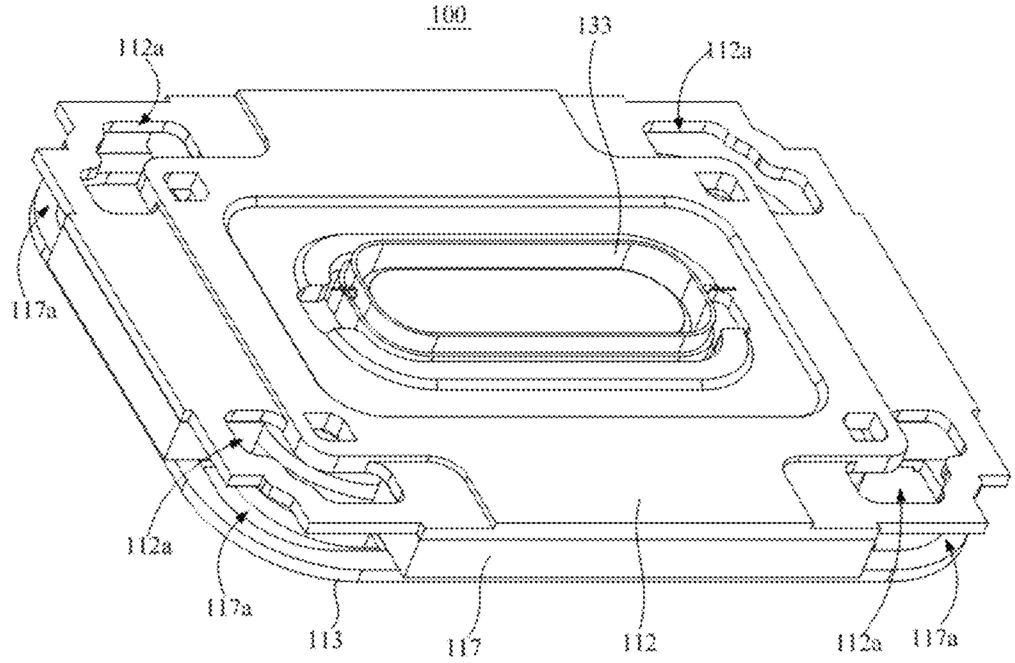
FIG. 3 is another partial structural schematic diagram of the sound generating module in FIG. 1.

Please refer to FIGS. 1 and 3 together, in an embodiment of the present disclosure, the expanded cavity 30*a* communicates with the second rear cavity 15*a* through the second magnetic gap 11*b*.

In this embodiment, the expansion chamber 30*a* communicates with the second rear chamber 15*a* through the second magnetic gap 11*b*, and the second magnetic gap 11*b* is arranged opposite to the second diaphragm 151 of the speaker unit 15, so that the airflow in the second rear chamber 15*a* can flow in the same direction as the vibration direction of the second diaphragm 151 when driven by the second diaphragm 151. Specifically, when the airflow in the second rear chamber 15*a* is compressed by the second diaphragm 151, it can enter the second magnetic gap 11*b* relatively smoothly along the vibration direction of the second diaphragm 151, and finally enter the expansion chamber 30*a* relatively smoothly. When the airflow in the second rear chamber 15*a* is expanded by the second diaphragm 151, the airflow in the expansion chamber 30*a* first enters the second magnetic gap 11*b* in the direction of the second diaphragm 151, and then can enter the second rear chamber 15*a* relatively smoothly along the vibration direction of the second diaphragm 151. That is, the expanded cavity 30*a* communicates with the second rear cavity 15*a* through the second magnetic gap 11*b*, which is conducive to improving the smoothness of the airflow between the second rear cavity 15*a* and the expanded cavity 30*a*, thereby ensuring the vibration performance of the second diaphragm 151. Of course, it should be noted that the present disclosure is not limited thereto, and in other embodiments, the second frame 19 may also be provided with an opening that laterally conducts the second rear cavity 15*a* and the expanded cavity 30*a*.

Please refer to FIGS. 2 and 3 together, in an embodiment of the present disclosure, the outer magnet 117 of the magnetic circuit system 11 is provided with a first communicating hole 117*a*. The expanded cavity 30*a* communicates with the second magnetic gap 11*b* through the first communicating hole 117*a*.

In this embodiment, since the inner side of the outer magnet 117 is the second magnetic gap 11*b*, and the outer side is the expanded cavity 30*a*. By directly forming the first communicating hole 117*a* on the outer magnet 117, the second magnetic gap 11*b* located on the inner side of the outer magnet 117 and the expanded cavity 30*a* located on the outer side of the outer magnet 117 can be communicated more easily, thereby facilitating the forming of the first communicating hole 117*a*. Here, the first communicating hole 117*a* can be directly formed to be lateral communicated, so that the first communicating hole 117*a* is more regular and can further improve the convenience of processing and forming. In an embodiment, in order to make the first communicating hole 117*a* to be more conveniently formed, the outer magnet 117 can be composed of a plurality of magnetic strips arranged at intervals. At this time, after the outer magnet 117 is installed, the gap between two adjacent magnetic strips can directly enclose the first communicating hole 117*a*. In addition, in order to facilitate the installation of the magnetic strips and the uniform conduction of the first communicating hole 117*a* in the circumferential direction, four magnetic strips can be provided, which are respectively provided on the four sides of the magnetic circuit system 11. At this time, the first communicating holes 117*a* formed between each two adjacent magnetic strips can be referred to be provided at the four corners of the magnetic circuit system 11. Of course, the present disclosure is not limited thereto. In other embodiments, when the outer magnet 117 has a ring-shaped closed structure, a hole can be directly formed on the outer magnet 117 to form the first communicating hole 117*a*.

Please refer to FIGS. 2 and 3 together, in an embodiment of the present disclosure, the first magnetic conductive plate 112 of the magnetic circuit system 11 is provided with a second communicating hole 112*a* at a position corresponding to the first communicating hole 117*a*. The first communicating hole 117*a* communicates with the expanded cavity 30*a* through the second communicating hole 112*a*.

In this embodiment, the second communicating hole 112*a* is provided so that the magnetic circuit system 11 can further communicate with the expansion chamber 30*a* at the side facing the receiver unit 13 based on communicating with the expansion chamber 30*a* laterally. That is, the communicating path between the second rear chamber 15*a* and the expansion chamber 30*a* is increased, which is conducive to further improving the smoothness of the airflow between the second rear chamber 15*a* and the expansion chamber 30*a*, so that the expansion chamber 30*a* can effectively expand the second rear chamber 15*a*.

In an embodiment of the present disclosure, the magnetic circuit system 11 further includes a mesh cover 118. The mesh cover 118 communicates with the first magnetic conductive plate 112, and covers the first communicating hole 117*a* and the second communicating hole 112*a*.

In this embodiment, the first communicating hole 117*a* and the second communicating hole 112*a* can be covered by the mesh cover 118, to isolate the particles filled in the expanded cavity 30*a*, thereby facilitating the improvement of the acoustic performance of the speaker unit 15. Moreover, due to the presence of the mesh cover 118, the first communicating hole 117*a* and the second communicating hole 112*a* can be directly formed into an opening with a relatively large aperture, thereby reducing the number of openings and the difficulty of opening the openings, and facilitating the improvement of the convenience of processing and forming the sound generating module 100.

Please refer to FIG. 1, in an embodiment of the present disclosure, the first frame 17 of the receiver unit 13 is provided with a first sound output channel 17*a* in communication with the external space of the sound generating module 100 at a position corresponding to the first diaphragm 131, and the fixing shell 30 is provided with an avoidance structure 30*b* for avoiding the first sound output channel 17*a*.

In this embodiment, the avoidance structure 30*b* is provided on the fixing shell 30, so that the receiver unit 13 can extend to the outside of the sound generating module 100 through the avoidance structure 30*b*, to realize the communication between the first rear cavity 13*a* and the external space of the sound generating module 100. At the same time, the first sound output channel 17*a* is provided on the first frame 17 and passes through the fixing shell 30, so that the first sound output channel 17*a* can conveniently communicate with the sound outlet hole provided on the housing of the electronic device without passing through the fixing shell 30. In this way, it is avoided that the relatively small sound emitted by the receiver unit 13 is excessively lost due to the excessively long transmission path. That is, by reducing the sound loss caused by the sound generated by the receiver unit 13 in the sound propagation path, the final sound effect of the receiver unit 13 is improved. Here, the avoidance structure 30*b* can be a hole structure directly formed on the surface of the fixing shell 30; of course, it can also be a groove structure formed by a recess on the surface of the fixing shell 30, and then a hole structure is further formed on the bottom wall of the groove structure. At this time, the avoidance structure 30*b* is formed by the combination of the groove structure and the hole structure.

Please refer to FIGS. 1 and 2 together, in an embodiment of the present disclosure, the first frame 17 passes through the avoidance structure 30*b* to the outside, and the outer wall of the first frame 17 and the inner wall of the avoidance structure 30*b* enclose to form an external channel 30*c*, and the external channel 30*c* is isolated from the internal space of the fixing shell 30. The first frame 17 is provided with a third communicating hole 17*b*, and the third communicating hole 17*b* communicates the first rear cavity 13*a* and the external channel 30*c*.

In this embodiment, the outer wall of the first frame 17 and the inner wall of the avoidance structure 30*b* enclose to form an external channel 30*c*, and the external channel 30*c* directly communicates with the external channel 30*c* of the sound generating module 100. In this way, the third communicating hole 17*b* provided on the first frame 17 is a lateral communicating structure, which can easily achieve communication with the external space of the sound generating module 100 by in communication with the external channel 30*c*. Moreover, when the sound generating module 100 is installed in the housing of the electronic device, even if the inner wall of the housing abuts against the end of the first frame 17 away from the speaker unit 15, since the third communicating hole 17*b* laterally communicates with the external channel 30*c*, it is difficult to be blocked by the inner wall of the housing or other components, thereby facilitating the communication between the first rear cavity 13*a* in the sound generating module 100 and the installation cavity of the housing of the electronic device. Of course, it should be noted that the present disclosure is not limited thereto. When the first frame 17 does not pass through the fixing shell 30, it is also possible to communicate the first rear cavity 13*a* and the external space of the sound generating module 100 by passing a communicating pipe through the first frame 17 and the fixing shell 30.

Please refer to FIG. 2, in an embodiment of the present disclosure, the third communicating holes 17*b* are disposed on two opposite sides of a short axis of the first frame 17. The fixing shell 30 is coupled to the upper side of the first magnetic conductive plate 112 of the magnetic circuit system 11.

It can be understood that, since the directions of the long axis and short axis of the sound generating module 100 are usually corresponding to the directions of the long axis and short axis of the electronic device housing, and the sound outlet hole provided on the display surface of the electronic device housing is basically provided at one end of the housing in the long axis direction (it can also be referred to be provided at the top of the housing), when the sound generating module 100 is installed in the electronic device housing, the first sound output channel 17*a* of the sound generating module 100 is usually arranged in the long axis direction with the sound outlet hole provided on the display surface of the electronic device housing. Therefore, when the sound generating module 100 is installed in the electronic device housing, a sound passage through which the outlet of the first sound output channel 17*a* of the sound generating module 100 communicate with the sound outlet hole provided on the display surface of the electronic device housing needs to be provided in the housing along its long axis direction. At this time, the sound channel may cover the side area of the avoidance structure 30*b* near the sound outlet hole set on the display surface of the housing in the long axis direction of the sound generating module 100, thereby affecting the communication between the external channel 30*c* located in the avoidance structure 30*b* and the installation cavity of the electronic device housing in the side area.

Therefore, by providing the third communicating hole 17*b* on the two opposite sides of a short axis of the first frame 17, the area of the avoidance structure 30*b* covered by the sound channel extending in the long axis direction can be avoided, which is conducive to ensuring that the first rear cavity 13*a* of the receiver unit 13 can be smoothly communicating with the installation cavity of the electronic device housing through the third communicating hole 17*b* and the external channel 30*c* in the avoidance structure 30*b*. In addition, the fixing shell 30 is combined with the upper side of the first magnetic conductive plate 112 of the magnetic circuit system 11, so that the fixing shell 30 can be attached to the surface of the first magnetic conductive plate 112 of the magnetic circuit system 11 that is away from the second magnetic conductive plate 113, which is conducive to the isolation of the external channel 30*c* located in the avoidance structure 30*b* and the expanded cavity 30*a* located in the fixing shell 30.

Please refer to FIG. 1, in an embodiment of the present disclosure, a surface of the fixing shell 30 corresponding to the exposed surface of the receiver unit 13 is defined as the first surface 31. The fixing shell 30 also has a second surface arranged opposite to the first surface 31, and a side surface 35 connecting the first surface 31 and the second surface; the fixing shell 30 is provided with a second sound output channel 30*d* at a position corresponding to the second diaphragm 151, and the outlet of the second sound output channel 30*d* passes through the side surface 35.

In this embodiment, the outlet of the first sound output channel 17*a* passes through the first surface 31, and the outlet of the second sound output channel 30*d* is provided at the side peripheral surface 35. The two sound outlet holes on the electronic device are usually disposed on the display surface of the housing and the side wall surface coupling to the display surface. Therefore, the directions of the outlet of the first sound output channel 17*a* and the outlet of the second sound output channel 30*d* of the sound generating module 100 can be respectively matched with the directions of the two sound outlet holes disposed on the display surface and the side wall surface of the housing of the electronic device. That is, when the sound generating module 100 in this solution is installed in the housing of an electronic device, the outlet direction of the first sound output channel 17*a* on the sound generating module 100 that passes through the first surface 31 can be adapted to the direction of the sound outlet hole set on the display surface of the housing of the electronic device, and the outlet direction of the second sound output channel 30*d* on the sound generating module 100 that is disposed at the side peripheral surface 35 connecting to the first surface 31 can be adapted to the direction of the sound outlet hole disposed at the side wall surface of the housing connecting to the display surface in the electronic device, thereby facilitating the communication between the two sound outlet holes on the housing of the electronic device and the first sound output channel 17*a* and the second sound output channel 30*d*. Of course, it should be noted that the present disclosure is not limited thereto. In other embodiments, the outlet of the first sound output channel 17*a* and the outlet of the second sound output channel 30*d* can also be arranged back-to-back.

Please refer to FIG. 1, in an embodiment of the present disclosure, the second sound output channel 30*d* includes a first channel section 30*e* and a second channel section 30*f* that communicate with each other in its sound outlet direction thereof. The sound passing direction of the first channel section 30*e* is opposite to the sound passing direction of the first sound output channel 17*a*, and the sound passing direction of the second channel section 30*f* is provided at an angle to the sound passing direction of the first channel section 30*e*.

In this embodiment, the second sound output channel 30*d* is composed of the first channel section 30*e* and the second channel section 30*f*, so that the structure of the second sound output channel 30*d* can be simplified on the basis of realizing that the outlet of the second channel section 30*f* can pass through the side circumferential surface 35 of the fixing shell 30, thereby facilitating the processing and forming convenience of the second sound output channel 30*d*. Moreover, the second channel section 30*f* can also increase the cross-sectional area of the second channel section 30*f* in the sound passing direction, to improve the smoothness of the airflow flowing in the second channel section 30*f*, and thus further improve the sound effect of the speaker unit 15.

The present disclosure also provides an electronic device, including a housing and the sound generating module 100. The specific structure of the sound generating module 100 refers to the above embodiment. Since the electronic device adopts all the embodiments of all the above embodiments, it at least has all the beneficial effects brought by the embodiments of the above embodiments, which will not be repeated here. Here, an installation cavity is formed in the housing, the sound generating module 100 is installed in the installation cavity, and the first rear cavity 13*a* of the sound generating module 100 communicates with the installation cavity through the third communicating hole 17*b*. At this time, the first rear cavity 13*a* of the receiver unit 13 communicates with the installation cavity of the housing, so that the air pressure change in the first rear cavity 13*a* can be adjusted through the installation cavity, thereby avoiding the influence of the amplitude of the first diaphragm 131 of the receiver unit 13 due to the excessive air pressure in the first rear cavity 13*a*. That is, through its communication with the installation cavity of the housing, it can avoid the first diaphragm 131 of the receiver unit 13 from being subjected to excessive resistance during the vibration process, which is conducive to improving the smoothness of the vibration of the first diaphragm 131 of the receiver unit 13 and ensuring the acoustic performance of the receiver unit 13. Furthermore, since the second rear cavity 15*a* of the speaker unit 15 communicates with the expanded cavity 30*a* provided in the sound generating module 100 itself, and only the first rear cavity 13*a* of the receiver unit 13 communicates with the installation cavity of the housing of the electronic device, when the receiver unit 13 and the speaker unit 15 are working, the airflow driven by the speaker unit 15 will not transmit the airflow vibration to the installation cavity of the housing, but will only flow into the expanded cavity 30*a* provided on the sound generating module 100 itself, that is, only the airflow driven by the receiver unit 13 will cause collision in the installation cavity of the housing of the electronic device. At this time, since the positive projection size of the receiver unit 13 is relatively small, the amplitude of the airflow vibration that it can drive is relatively small, and then when the airflow vibration driven by the receiver unit 13 is transmitted to the installation cavity of the housing, the collision amplitude of the housing is also very small, which also avoids the possibility of vibration of the housing of the electronic device and affecting the user experience.

The above description is only a preferred embodiment of the present disclosure, and does not limit the patent scope of the present disclosure. All equivalent structural changes made by using the contents of the present disclosure specification and drawings under the inventive concept of the present disclosure, or directly/indirectly applied in other related technical fields are included in the patent protection scope of the present disclosure.

What is claimed is:

1. A sound generating module, comprising a sound generating unit, wherein the sound generating unit comprises:

a magnetic circuit system, wherein the magnetic circuit system is formed with a first magnetic gap and a second magnetic gap that are isolated from each other;

a receiver unit comprising a first diaphragm and a first voice coil, wherein the first diaphragm and a side of the magnetic circuit system at which the first magnetic gap is formed enclose to form a first rear cavity, the first voice coil is accommodated in the first rear cavity, one end of the first voice coil is coupled to the first diaphragm, and the other end opposite to the one end is inserted into the first magnetic gap; and a speaker unit, comprising a second diaphragm and a second voice coil, wherein the second diaphragm and a side of the magnetic circuit system at which the second magnetic gap is formed enclose to form a second rear cavity, the second rear cavity and the first rear cavity are isolated from each other, the second voice coil is accommodated in the second rear cavity, one end of the second voice coil is coupled to the second diaphragm, and the other end opposite to the one end is inserted into the second magnetic gap; and a fixing shell fixing the sound generating unit, wherein the fixing shell and the sound generating unit enclose to form an expanded cavity, wherein the second rear cavity of the speaker unit communicates with the expanded cavity, the first rear cavity of the receiver unit is isolated from the expanded cavity, and the first rear cavity of the receiver unit communicates with an external space of the sound generating module, wherein the expanded cavity communicates with the second rear cavity through the second magnetic gap.

2. The sound generating module according to claim 1, wherein the first magnetic gap and the second magnetic gap are respectively formed on two opposite sides of the magnetic circuit system, and a center line of the first magnetic gap and a center line of the second magnetic gap are collinearly arranged.

3. The sound generating module according to claim 1, wherein the magnetic circuit system comprises:

a magnetic conductive component comprising a first magnetic conductive plate and a second magnetic conductive plate facing and spaced away from each other; and a magnet component, wherein the magnet component is arranged between the first magnetic conductive plate and the second magnetic conductive plate, and the magnet component comprises an inner magnet, a middle magnet and an outer magnet, wherein the middle magnet surrounds an outer side of the inner magnet and is spaced apart from the inner magnet, and the middle magnet and the inner magnet enclose to form the first magnetic gap, and wherein the outer magnet surrounds an outer side of the middle magnet and is spaced apart from the middle magnet, and the middle magnet and the outer magnet enclose to form the second magnetic gap.

4. The sound generating module according to claim 3, wherein the middle magnet has a closed annular structure, and the second magnetic conductive plate is not provided with an opening at a position corresponding to the first magnetic gap.

5. The sound generating module according to claim 3, wherein the sound generating unit further comprises:

a first frame disposed at a side of the first magnetic conductive plate away from the second magnetic conductive plate, the first diaphragm is fixed to the first frame and enclose, together with the first frame and the first magnetic conductive plate, to form the first rear cavity; and a second frame disposed at a side of the second magnetic conductive plate away from the first magnetic conductive plate, and the second diaphragm is fixed to the second frame and enclose, together with the second frame and the second magnetic conductive plate, to form the second rear cavity.

6. The sound generating module according to claim 5, wherein the outer magnet of the magnetic circuit system is provided with a first communicating hole, and the expanded cavity communicates with the second magnetic gap through the first communicating hole.

7. The sound generating module according to claim 6, wherein the first magnetic conductive plate of the magnetic circuit system is provided with a second communicating hole at a position corresponding to the first communicating hole, and the first communicating hole communicates with the expanded cavity through the second communicating hole.

8. The sound generating module according to claim 7, wherein the magnetic circuit system further comprises a mesh cover, wherein the mesh cover is coupled to the first magnetic conductive plate, and covers the first communicating hole and the second communicating hole.

9. The sound generating module according to claim 8, wherein the first frame of the receiver unit is provided with a first sound output channel in communication with the external space of the sound generating module at a position corresponding to the first diaphragm, and the fixing shell is provided with an avoidance structure for avoiding the first sound output channel.

10. The sound generating module according to claim 9, wherein the first frame passes through the avoidance structure to outside, an outer wall of the first frame and an inner wall of the avoidance structure enclose to form an external channel, and the external channel is isolated from an internal space of the fixing shell, and wherein the first frame is provided with a third communicating hole, and the first rear cavity communicates with the external channel through the third communicating hole.

11. The sound generating module according to claim 10, wherein the third communicating hole is disposed on two opposite sides of a short axis of the first frame, and the fixing shell is coupled to an upper side of the first magnetic conductive plate of the magnetic circuit system.

12. The sound generating module according to claim 9, wherein the fixing shell has a first surface corresponding to an exposed surface of the receiver unit, a second surface opposite to the first surface, and a side peripheral surface connecting the first surface and the second surface, and wherein the fixing shell is provided with a second sound output channel at a position corresponding to the second diaphragm, and an outlet of the second sound output channel passes through the side peripheral surface.

13. The sound generating module according to claim 12, wherein the second sound output channel comprises a first channel section and a second channel section that communicate with each other in a sound output direction thereof, a sound passing direction of the first channel section is opposite to a sound passing direction of the first sound output channel, and a sound passing direction of the second channel section forms an angle with the sound passing direction of the first channel section.

14. An electronic device, comprising:

a housing having an installation cavity formed therein; and a sound generating module, wherein the sound generating module is the sound generating module according to claim 1, wherein the sound generating module is installed in the installation cavity, and the first rear cavity of the sound generating module communicates with the installation cavity through a communicating hole.

* * * * *